US012673547B1

(12) United States Patent
McKinzie

(10) Patent No.: US 12,673,547 B1
(45) Date of Patent: Jul. 7, 2026

(54) ARCHITECTURE FOR MULTIPLE POWER SOURCE WORK VEHICLE POWERTRAIN

(71) Applicant: Deere & Company, Moline, IL (US)

(72) Inventor: Kyle K. McKinzie, Oswego, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/057,094

(22) Filed: Feb. 19, 2025

(51) Int. Cl.
*F16H 3/66* (2006.01)
*B60K 6/365* (2007.10)
(Continued)

(52) U.S. Cl.
CPC .............. *B60K 6/547* (2013.01); *B60K 6/365* (2013.01); *B60K 6/387* (2013.01); *B60K 17/02* (2013.01); *B60K 17/08* (2013.01); *E02F 9/202* (2013.01); *F16H 3/66* (2013.01); *F16H 57/021* (2013.01); *B60Y 2200/92* (2013.01);
(Continued)

(58) Field of Classification Search
CPC ........ B60K 6/547; B60K 6/365; B60K 6/387; B60K 17/02; B60K 17/08; E02F 9/202; F16H 3/66; F16H 2057/02034; F16H 2057/02056; F16H 57/021;
(Continued)

(56) References Cited

U.S. PATENT DOCUMENTS 3,214,987 A    11/1965  Schenck et al.
3,626,787 A    12/1971  Singer
(Continued)

FOREIGN PATENT DOCUMENTS

AT            11545 U1    12/2010
CN       101255907 B      10/2013
(Continued)

OTHER PUBLICATIONS

CNIPA Office Action for Application No. 201510165982.4 dated Aug. 9, 2018, Serial Notice No. 2018080601675890.
(Continued)

*Primary Examiner* — Farhana Pervin
(74) *Attorney, Agent, or Firm* — KLINTWORTH & ROZENBLAT LLP

(57) ABSTRACT

A powertrain for a work vehicle includes an engine and a transmission. The transmission includes a continuously variable power source (CVP), and a variator that is operably connected to the engine and the CVP. The variator includes a first planetary gear set and a second planetary gear set. A range shaft has a range shaft output gear secured thereto and an output shaft has an output shaft gear driven by the range shaft output gear. A first mode selector clutch has a first input component enmeshed with an output gear of the first planetary gear set and a first output component connected to the range shaft and a second mode selector clutch has a second input component enmeshed with an output gear of the second planetary gear set and a second output component connected to the range shaft input gear. The first mode selector clutch and the second mode selector clutch are selectively operable to couple the first input component with the first output component or the second input component with the second output component and thereby transfer power from the variator to the output shaft.

14 Claims, 9 Drawing Sheets

(51) Int. Cl.

| | |
|---|---|
| *B60K 6/387* | (2007.10) |
| *B60K 6/547* | (2007.10) |
| *B60K 17/02* | (2006.01) |
| *B60K 17/08* | (2006.01) |
| *E02F 9/20* | (2006.01) |
| *F16H 57/021* | (2012.01) |
| *F16H 57/02* | (2012.01) |

(52) U.S. Cl.
CPC .............. *F16H 2057/02034* (2013.01); *F16H 2057/02056* (2013.01); *F16H 2200/0034* (2013.01); *F16H 2200/2007* (2013.01)

(58) Field of Classification Search
CPC ..... F16H 2200/0034; F16H 2200/2007; B60Y 2200/92
See application file for complete search history.

(56) References Cited

U.S. PATENT DOCUMENTS

| | | | |
|---|---|---|---|
| 3,651,904 | A | 3/1972 | Snoy et al. |
| 3,714,845 | A | 2/1973 | Mooney, Jr. |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,156,577 | A | 10/1992 | Fredriksen et al. |
| 5,277,286 | A | 1/1994 | Yamamoto et al. |
| 5,353,662 | A | 10/1994 | Vaughters |
| 5,508,574 | A | 4/1996 | Vlock |
| 5,611,245 | A | 3/1997 | Mckee |
| 5,931,757 | A | 8/1999 | Schmidt |
| 6,254,509 | B1 | 7/2001 | Meyer |
| 6,394,925 | B1 | 5/2002 | Wontner et al. |
| 6,478,705 | B1 | 11/2002 | Holmes et al. |
| 6,641,505 | B2 | 11/2003 | Sayman et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan et al. |
| 7,479,081 | B2 | 1/2009 | Holmes |
| 7,491,144 | B2 | 2/2009 | Conlon |
| 7,611,433 | B2 | 11/2009 | Forsyth |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,439,787 | B2 | 5/2013 | Salamandra et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,672,069 | B2 | 3/2014 | Cherney et al. |
| 8,734,281 | B2 | 5/2014 | Ai et al. |
| 8,747,266 | B2 | 6/2014 | Aitzetmueller et al. |
| 8,784,246 | B2 | 7/2014 | Treichel et al. |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,097,342 | B2 | 8/2015 | Dix et al. |
| 9,206,885 | B2 | 12/2015 | Rekow et al. |
| 9,487,073 | B2 | 11/2016 | Love et al. |
| 9,562,592 | B2 | 2/2017 | Rekow et al. |
| 9,840,165 | B2 | 12/2017 | Cox |

| | | | |
|---|---|---|---|
| 9,840,827 | B2 | 12/2017 | Miyamoto et al. |
| 9,944,163 | B2 | 4/2018 | Mckinzie |
| 9,981,665 | B2 | 5/2018 | Rekow et al. |
| 10,029,694 | B2 | 7/2018 | Sharp et al. |
| 10,119,598 | B2 | 11/2018 | Rekow et al. |
| 10,619,711 | B2 | 4/2020 | Fliearman et al. |
| 10,647,193 | B2 | 5/2020 | Mckinzie et al. |
| 10,655,710 | B2 | 5/2020 | Rekow et al. |
| 10,670,124 | B2 | 6/2020 | Rekow et al. |
| 10,738,868 | B2 | 8/2020 | Mckinzie et al. |
| 10,975,959 | B2 | 4/2021 | Mckinzie et al. |
| 11,052,747 | B2 | 7/2021 | Ore |
| 11,091,018 | B2 | 8/2021 | Ore et al. |
| 11,137,052 | B2 | 10/2021 | Ore et al. |
| 11,325,459 | B2 | 5/2022 | Ore |
| 11,351,983 | B2 | 6/2022 | Mckinzie et al. |
| 11,413,960 | B2 | 8/2022 | Bindl et al. |
| 11,535,234 | B2 | 12/2022 | Duffy et al. |
| 11,572,672 | B2 | 2/2023 | Vilar et al. |
| 11,585,412 | B1 | 2/2023 | Ore et al. |
| 11,607,948 | B1 | 3/2023 | Ore et al. |
| 11,613,246 | B2 | 3/2023 | Mckinzie et al. |
| 11,628,822 | B2 | 4/2023 | Mckinzie et al. |
| 11,820,361 | B2 | 11/2023 | Black et al. |
| 11,846,085 | B2 | 12/2023 | Wu et al. |
| 11,913,528 | B1 | 2/2024 | Neumann et al. |
| 2001/0016536 | A1 | 8/2001 | Minowa et al. |
| 2003/0186769 | A1 | 10/2003 | Ai et al. |
| 2004/0094381 | A1 | 5/2004 | Versteyhe |
| 2004/0172184 | A1 | 9/2004 | Vukovich et al. |
| 2005/0036894 | A1 | 2/2005 | Oguri |
| 2005/0049100 | A1 | 3/2005 | Ai et al. |
| 2005/0080547 | A1 | 4/2005 | Scelers et al. |
| 2006/0046886 | A1 | 3/2006 | Holmes et al. |
| 2006/0111212 | A9 | 5/2006 | Ai et al. |
| 2006/0142104 | A1 | 6/2006 | Saller |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0243966 | A1* | 10/2007 | Holmes .................. B60K 6/445 475/5 |
| 2007/0249455 | A1 | 10/2007 | Hasegawa et al. |
| 2008/0171626 | A1 | 7/2008 | Pollman |
| 2009/0250278 | A1 | 10/2009 | Kawasaki et al. |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller et al. |
| 2013/0023370 | A1 | 1/2013 | Grad et al. |
| 2013/0123055 | A1 | 5/2013 | Mattsson et al. |
| 2013/0173126 | A1 | 7/2013 | Ruebsam |
| 2013/0211655 | A1 | 8/2013 | Ogata et al. |
| 2013/0231815 | A1 | 9/2013 | Tanishima et al. |
| 2013/0325238 | A1 | 12/2013 | Kato et al. |
| 2014/0018201 | A1 | 1/2014 | Tolksdorf |
| 2014/0128196 | A1 | 5/2014 | Rintoo |
| 2014/0128217 | A1 | 5/2014 | Tabata et al. |
| 2014/0248986 | A1 | 9/2014 | Weeramantry et al. |
| 2014/0315685 | A1 | 10/2014 | Hofler |
| 2015/0006007 | A1 | 1/2015 | Kitahata et al. |
| 2015/0072823 | A1 | 3/2015 | Rintoo |
| 2015/0142232 | A1 | 5/2015 | Tabata et al. |
| 2015/0142282 | A1 | 5/2015 | Lee et al. |
| 2015/0183436 | A1 | 7/2015 | Rekow et al. |
| 2015/0184726 | A1 | 7/2015 | Rekow et al. |
| 2015/0292608 | A1 | 10/2015 | Mckinzie |
| 2016/0090091 | A1 | 3/2016 | Gugel et al. |
| 2016/0201295 | A1 | 7/2016 | Kishimoto et al. |
| 2016/0251827 | A1 | 9/2016 | Ge |
| 2016/0272059 | A1 | 9/2016 | Watanabe et al. |
| 2017/0066447 | A1 | 3/2017 | Hertel et al. |
| 2017/0102059 | A1 | 4/2017 | Rekow et al. |
| 2017/0129477 | A1 | 5/2017 | Ideshio et al. |
| 2017/0203646 | A1 | 7/2017 | Mueller et al. |
| 2017/0284508 | A1 | 10/2017 | Devreese |
| 2017/0284517 | A1 | 10/2017 | Rekow et al. |
| 2017/0328453 | A1 | 11/2017 | Mckinzie et al. |
| 2017/0362799 | A1 | 12/2017 | Nakagawa et al. |

(56) References Cited

U.S. PATENT DOCUMENTS

| | | |
|---|---|---|
| 2018/0022353 A1 | 1/2018 | Thompson et al. |
| 2018/0043764 A1 | 2/2018 | Mckinzie et al. |
| 2018/0056982 A1 | 3/2018 | Endo et al. |
| 2018/0149247 A1 | 5/2018 | Rekow et al. |
| 2018/0298993 A1 | 10/2018 | Fliearman et al. |
| 2018/0347416 A1 | 12/2018 | Komori et al. |
| 2019/0111773 A1 | 4/2019 | Nishikawa et al. |
| 2019/0118642 A1 | 4/2019 | Cho et al. |
| 2019/0176826 A1 | 6/2019 | Kuras et al. |
| 2019/0337376 A1 | 11/2019 | Ore |
| 2019/0344654 A1 | 11/2019 | Kaltenbach et al. |
| 2019/0346036 A1 | 11/2019 | Ore et al. |
| 2019/0389298 A1 | 12/2019 | Kaltenbach et al. |
| 2020/0309258 A1 | 10/2020 | Mckinzie et al. |
| 2021/0062900 A1 | 3/2021 | Ore et al. |
| 2021/0129829 A1 | 5/2021 | McKinzie et al. |
| 2021/0254696 A1 | 8/2021 | Wu et al. |
| 2022/0111721 A1 | 4/2022 | Ore |
| 2022/0227351 A1 | 7/2022 | Mckinzie et al. |
| 2023/0166718 A1 | 6/2023 | Black et al. |
| 2023/0235535 A1 | 7/2023 | Eastman |
| 2024/0017727 A1 | 1/2024 | Eastman |

FOREIGN PATENT DOCUMENTS

| | | |
|---|---|---|
| CN | 102844588 B | 5/2015 |
| DE | 1173348 B | 7/1964 |
| DE | 4010919 A1 | 10/1991 |
| DE | 4127266 A1 | 2/1993 |
| DE | 4131572 A1 | 3/1993 |
| DE | 19621200 A1 | 11/1997 |
| DE | 19954636 A1 | 5/2001 |
| DE | 201500200973 | 5/2001 |
| DE | 10128076 A1 | 12/2002 |
| DE | 10319252 A1 | 11/2004 |
| DE | 102008030521 A1 | 1/2009 |
| DE | 102008032320 A1 | 1/2010 |
| DE | 202009007972 U1 | 5/2010 |
| DE | 102010021846 A1 | 12/2011 |
| DE | 102011102184 A1 | 7/2012 |
| DE | 112006002537 B4 | 8/2012 |
| DE | 102011005868 A1 | 9/2012 |
| DE | 102012216781 A1 | 3/2013 |
| DE | 102011115002 A1 | 4/2013 |
| DE | 102011002210 A1 | 2/2014 |
| DE | 102013200158 A1 | 7/2014 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015111119 A1 | 1/2016 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016204727 A1 | 9/2017 |
| DE | 102006041160 B4 | 5/2018 |
| DE | 102018201139 A1 | 12/2018 |
| DE | 102018108510 A8 | 1/2019 |
| DE | 102018209940 A8 | 1/2019 |
| DE | 102018212712 A1 | 1/2019 |
| DE | 102010026460 B4 | 5/2019 |
| DE | 102018128741 A1 | 6/2019 |
| DE | 102019000846 A1 | 8/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020213675 A1 | 5/2021 |
| DE | 102020215219 A1 | 6/2021 |
| DE | 102016120965 B4 | 3/2022 |
| DE | 102021209495 A1 | 4/2022 |
| DE | 102022210721 A1 | 7/2023 |
| EP | 0805059 B1 | 8/2000 |
| EP | 1099882 B1 | 3/2004 |
| EP | 1707416 B1 | 8/2007 |
| EP | 2466168 A1 | 6/2012 |
| EP | 2466169 B1 | 6/2014 |
| EP | 2631144 B1 | 9/2015 |
| EP | 2832567 B1 | 12/2017 |
| EP | 2682531 B1 | 6/2018 |
| EP | 2855226 B1 | 9/2018 |
| JP | 6462174 B1 | 1/2019 |
| WO | WO2007017975 A1 | 2/2007 |
| WO | WO2008019799 A2 | 2/2008 |
| WO | WO2011092643 A1 | 8/2011 |
| WO | WO2012171812 A1 | 12/2012 |
| WO | WO2017107848 A1 | 6/2017 |
| WO | WO2021115580 A1 | 6/2021 |

OTHER PUBLICATIONS

USPTO, Non-Final Office Action dated Sep. 12, 2024 issued in U.S. Appl. No. 17/585,726.
USPTO, Final Office Action issued in Utility U.S. Appl. No. 17/585,726 dated Jan. 6, 2025.
USPTO, Non-Final Office Action issued in Utility U.S. Appl. No. 17/585,726 dated May 21, 2025.
USPTO, Non-Final Office Action issued in Utility U.S. Appl. No. 18/050,683 dated Aug. 3, 2023.
USPTO, Non-Final Office Action issued in Utility U.S. Appl. No. 18/357,910 dated Jan. 6, 2025.
USPTO, Ex Parte Quayle Action issued in U.S. Appl. No. 17/171,856 on Oct. 11, 2022.
USPTO, Final Office Action in U.S. Appl. No. 14/249,258 issued Apr. 21, 2017.
USPTO, Final Office Action in U.S. Appl. No. 15/664,289 issued Dec. 13, 2018.
USPTO, Final Office Action in U.S. Appl. No. 15/971,867 issued Jun. 24, 2020.
USPTO, Final Office Action issued in U.S. Appl. No. 16/555,913 on Apr. 20, 2021.
USPTO, Non-Final Office Action in U.S. Appl. No. 14/249,258 issued Oct. 17, 2016.
USPTO, Non-Final Office Action in U.S. Appl. No. 14/249,258 issued Aug. 22, 2017.
USPTO, Non-Final Office Action in U.S. Appl. No. 14/536,097 issued Sep. 25, 2017.
German Search Report issued in application No. DE1020182036705 dated Dec. 20, 2018 with translation.
German Search Report issued in application No. DE1020182099391 dated Feb. 27, 2019 with translation.
German Search Report issued in application No. DE1020182099405 dated Feb. 28, 2019 with translation.
German Search Report issued in application No. DE102018210616 dated Feb. 1, 2019 with translation.
German Search Report issued in application No. DE102018212712 dated Apr. 12, 2019 with translation.
German Search Report issued in application No. DE102019204706 dated Dec. 17, 2019 with translation.
German Search Report issued in application No. DE102019205211 dated Sep. 5, 2019 with translation.
German Search Report issued in application No. DE1020202026513 dated Sep. 1, 2020 with translation.
German Search Report issued in application No. DE102020209003.3 dated Apr. 15, 2021 with translation.
German Search Report issued in application No. DE102020213675.0 on Mar. 17, 2021 with translation.
German Search Report issued in application No. DE102022210864.7 dated Jun. 23, 2023 with translation.
German Search Report issued in application No. DE102022210867.1 dated Jun. 30, 2023 with translation.
German Search Report issued in application No. DE10215206174 dated Jul. 16, 2015 with translation.

(56)        References Cited

OTHER PUBLICATIONS

German Search Report issued in application No. DE102021209495.3 dated Jan. 11, 2022 with translation.
German Search Report issued in application No. DE102021212506.9 dated Jun. 20, 2022 with translation.
German Search Report issued in application No. DE102021214746.1 dated Jun. 30, 2022 with translation.
German Search Report issued in application No. DE102022210460.9 dated May 8, 2023 with translation.
German Search Report issued in application No. DE102022210721.7 dated Jun. 1, 2023 with translation.
German Search Report issued in application No. DE102023125157.0 dated Jun. 3, 2024 with translation.
German Search Report issued in application No. DE102024117219.3 dated Feb. 7, 2025 with translation.
German Search Report issued in application No. DE102017220666.7 dated May 28, 2021 with translation.
Extended European Search Report issued in counterpart application No. 20205965.5 dated Jul. 28, 2021.
Jang, Jinhwan, Wheel Slip-based Road Surface Slipperiness Detection, The Open Transportation Journal, 2020, vol. 14, Korea Institute of Civil Engineering and Building Technology, South Korea, accepted Jul. 6, 2020, available at https://creativecommons.org/licensesiby/4.0/legalcode.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
John M. Miller, Hybrid Electric Vehicle Propulsion System Architectures of the e-CVT Type, IEEE Transactions on Power Electronics, vol. 21, No. 3, May 2006.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
USPTO, Non-Final Office Action issued in U.S. Appl. No. 17/559,496 on Aug. 31, 2022.
USPTO, Non-Final Office Action issued in U.S. Appl. No. 17/538,691 on Sep. 15, 2022.
USPTO, Non-Final Office Action issued in U.S. Appl. No. 17/154,729 on Jul. 15, 2022. (7 pages).
USPTO, Non-Final Office Action in U.S. Appl. No. 17/066,746 issued Oct. 26, 2021.
USPTO, Non-Final Office Action in U.S. Appl. No. 16/555,913 issued Jan. 4, 2021.
USPTO, Non-Final Office Action in U.S. Appl. No. 16/371,598 issued Jul. 21, 2020.
USPTO, Non-Final Office Action in U.S. Appl. No. 15/971,867 issued Dec. 24, 2020.
USPTO, Non-Final Office Action in U.S. Appl. No. 15/971,867 issued Dec. 12, 2019.
USPTO, Non-Final Office Action in U.S. Appl. No. 15/879,796 issued Aug. 23, 2019.
USPTO, Non-Final Office Action in U.S. Appl. No. 15/793,522 issued Apr. 18, 2019.
USPTO Final Office Action issued in Utility U.S. Appl. No. 18/357,910 dated Jul. 2, 2025.
USPTO, Non-Final Office Action in U.S. Appl. No. 15/485,911 issued Feb. 8, 2019.
USPTO, Non-Final Office Action in U.S. Appl. No. 15/628,979 issued Nov. 5, 2019.
USPTO, Non-Final Office Action in U.S. Appl. No. 15/664,289 issued Jul. 26, 2018.
USPTO Final Office Action issued in Utility U.S. Appl. No. 7/585,726 dated Sep. 11, 2025.

* cited by examiner

ARCHITECTURE FOR MULTIPLE POWER SOURCE WORK VEHICLE POWERTRAIN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicle powertrains, including powertrains for the operation of work vehicles for agricultural, forestry, construction, and other applications.

BACKGROUND OF THE DISCLOSURE

Work vehicles may utilize both a traditional engine (e.g., an internal combustion engine) and one or more continuously variable power sources ("CVP") (e.g., an electric motor/generator or hydraulic motor/pump, and so on) to provide useful power for traction and to perform work operations. Such power systems may be operated in various modes that provide engine-only mechanical power, non-mechanical- or CVP-only power, or combined mechanical and non-mechanical "split-path" power. In various such power systems, one or more CVPs may operate in series or parallel to deliver or utilize the power. For example, the CVPs may provide power to or be incorporated within a continuously variable transmission ("CVT") that may also receive engine power and output the direct mechanical-, CVP-, or split-path power to ground-engaging members (e.g., wheels or tracks) or drive axles in order to drive vehicle traction.

SUMMARY OF THE DISCLOSURE

The disclosure provides a powertrain for a work vehicle that includes an engine and a transmission. The transmission includes a continuously variable power source (CVP), a variator, a range shaft having a range shaft output gear secured thereto, and an output shaft having an output shaft gear driven by the range shaft output gear. The variator is operably connected to the engine and the CVP and includes a first planetary gear set and a second planetary gear set. The transmission also includes a first mode selector clutch having a first input component enmeshed with an output gear of the first planetary gear set and a first output component connected to the range shaft and a second mode selector clutch having a second input component enmeshed with an output gear of the second planetary gear set and a second output component connected to the range shaft. The first mode selector clutch and the second mode selector clutch are selectively operable to couple the first input component with the first output component or the second input component with the second output component and thereby transfer power from the variator to the output shaft.

The disclosure also provides a transmission for a work vehicle having an engine. The transmission includes a housing and the housing has disposed therein a continuously variable power source (CVP), a variator that is operably connected to the engine and the CVP, a range shaft having a range shaft output gear secured thereto, and an output shaft driven by the range shaft output gear. The variator comprises a first planetary gear set and a second planetary gear set. The housing further has disposed therein a first mode selector clutch having a first input component enmeshed with an output gear of the first planetary gear set and a first output component configured to drive the range shaft and a second mode selector clutch having a second input component enmeshed with an output gear of the second planetary gear set and a second output component configured to drive the range shaft. The first mode selector clutch and the second mode selector clutch are selectively operable to couple the first input component with the first output component or the second input component with the second output component and thereby transfer power from the variator to the output shaft.

In certain embodiments, the first planetary gear set is a low planetary gear set and the second planetary gear set is a high planetary gear set. In some embodiments, the output gear of the first planetary gear set is a carrier of the first planetary gear set. In further embodiments, the output gear of the second planetary gear set is a ring gear of the second planetary gear set.

In certain embodiments, the transmission further includes a clutch shaft and a third mode selector clutch, wherein a third input component of the third mode selector clutch is enmeshed with both an output gear secured to an output shaft of the CVP and an input gear of the first planetary gear set, and a third output component of the third mode selector clutch is connected to the clutch shaft. In some embodiments, the transmission is operated in a first mode in which the third mode selector clutch is engaged to transfer power to both the clutch shaft and the variator using power from the CVP, a second mode in which the first mode selector clutch is engaged and the third mode selector clutch is disengaged, and a third mode in which the second mode selector clutch is engaged. In further embodiments, the transmission includes a clutch shaft output gear secured the clutch shaft and the clutch shaft output gear is operable to transfer power to the variator. In still further embodiments, the transmission includes a reverse clutch and an input component of the reverse clutch is driven by an output shaft of the engine and an output component of the reverse clutch is connected to the clutch shaft.

In certain embodiments, the powertrain or work vehicle also includes a forward clutch, wherein an input component of the forward clutch is secured to an output shaft of the engine and output component of the forward clutch is configured to directly transfer power from the engine to the variator when the input component of the forward clutch is coupled with the output component of the forward clutch.

In certain embodiments, the CVP operates in a first direction and an opposite second direction while the output shaft is driven in the first direction.

The details of one or more embodiments are set forth in the accompanying drawings and the description below. Other features and advantages will become apparent from the description, the drawings, and the claims.

BRIEF DESCRIPTION OF THE DRAWINGS

FIG. 2C is a schematic diagram showing a power transfer path in a third forward operating mode of the example architecture of FIG. 2;

FIG. 2E is a schematic diagram showing a power transfer path in a third reverse operating mode of the example architecture of FIG. 2;

Like reference symbols in the various drawings indicate like elements.

DETAILED DESCRIPTION

Figure 1:
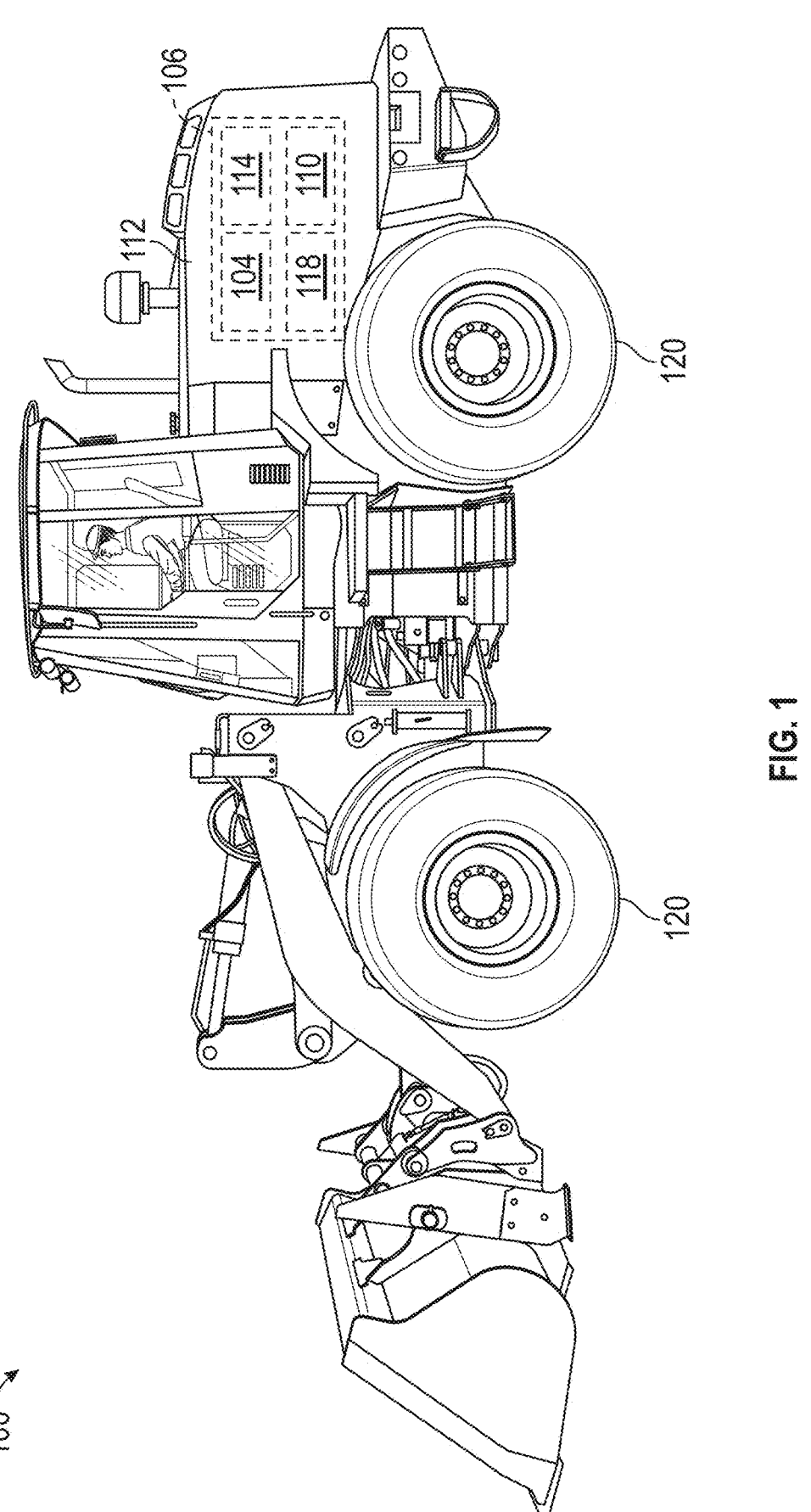
FIG. 1 is an example work vehicle in the form of a wheel loader in which a powertrain of the present disclosure may be incorporated.

The following describes one or more example embodiments of the disclosed powertrain for a work vehicle as shown in the accompanying figures of the drawings described briefly above. Various modifications to the example embodiments may be contemplated by one of skill in the art. Discussion herein focuses on the powertrain being for a work vehicle, such as a wheel loader, but the powertrain disclosed herein may be utilized in other contexts, including other work vehicle platforms in the agriculture, construction, forestry, mining, and other industries.

In the discussion below, various example configurations of shafts, gears, clutches, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, gears and/or other components of the powertrain disclosed as being enmeshed with one another may mean that that two or more components are indeed physically enmeshed with one another in some embodiments. However, it should be understood that a first component described as being enmeshed with a second component may also encompass the first component being configured to drive or to be driven by the second component.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a planetary gear set or other summing assembly).

Overview

A work vehicle includes a chassis, a powertrain having a power generating engine and a transmission, a driveline, and a plurality of ground-engaging members (e.g., wheels, tracks, etc.). The driveline includes a driveshaft, one or more axles coupled to the ground-engaging members, and one or more differentials that couple the driveshaft to corresponding ones of the one or more axles. The transmission transmits power generated by the engine to an output shaft thereof coupled to the driveshaft and thereby causes rotation of the driveshaft and such rotation causes the one or more axles to rotate in turn via the differential. The transmission may be operated in various modes and each mode provides a combination of torque and rotational speed necessary to meet the operational needs of the work vehicle.

The transmission may include one or more continuously variable power sources (CVPs) such as an electric motor, gears, clutches, shafts, and other components to transmit power generated by the engine to the output shaft. Mechanical power from the engine may be converted to electrical power that drives the CVP. A controller may operate the transmission in different modes to drive the output shaft (and thus the work vehicle) using power provided by the CVP only or a combination of mechanical power supplied directly from the engine without conversion to electrical power and power from the CVP.

Electrical motors may be utilized for the CVP that alone provide sufficient torque to support operation of the work vehicle in certain modes. Further, the controller may dynamically adjust the speed of such electrical motors and selectively operate the motors in a first direction or a second direction opposite to the first direction. For example, the first direction may be associated with forward movement of the work vehicle and the second direction may be associated with reverse movement of the work vehicle. Operating the transmission in a CVP-only mode may be particularly suitable in situations when the work vehicle is operated at rapidly varying speeds and directions, for example, when a wheel loader is operated to move piles of material at a work site, and the like. For example, using an appropriate electrical motor may result in a significant increase in the operating speed range when the transmission is operated in the CVP-only mode before a shift to a split-path mode of operation is necessary because the output speed, torque, and direction of the output shaft may be varied electronically by controlling the output speed and direction of the CVP. The increased operating speed range results in smoother operation of the work vehicle and greater comfort of the operator of the work vehicle.

Further, even in those modes in which the transmission uses direct mechanical power from the engine and power from the CVP to drive the output shaft (i.e., in a split-path mode), the speed and direction of the CVP output may be varied electronically to provide an increased speed range and may allow the use of a lower gear ratio between the CVP and the output shaft even at moderate speeds.

One having ordinary skill in the art will appreciate that reflected inertia of the CVP varies in accordance with a square of a gear ratio between the CVP and the output shaft and such inertia must be overcome by torque generated by the CVP. Use of a CVP comprising state of the art electric motor technology with higher torque density may allow for reduced gear reduction between the CVP and the output shaft of the transmission, thus lowering reflected inertia and in turn resulting in improved transfer of torque to the output shaft and smoother transitions between modes.

In one embodiment, the transmission includes (in addition to the one or more CVPs and the output shaft), a clutch shaft, a variator, a range shaft, clutches, and various gears. Further, as discussed in greater detail below, multiple clutches are connected to or otherwise configured to drive a common shaft and result in a reduction in the number of parts (e.g., shafts and gears) necessary for operation of the transmission. Such reduction in parts results in, at least, a corresponding reduction in the cost of the transmission and the housing/packaging requirements of the transmission.

The variator includes a first input and a second input. Mechanical power generated by the engine or the CVP may be selectively transferred to the first input and at least a first portion of the power generated by the CVP is transferred to the second input of the variator while the work vehicle is operated. A first mode selector clutch and a reverse clutch are connected to the clutch shaft and drive the clutch shaft using a second portion of power generated by the CVP or mechanical power directly from the engine, respectively, when one of these clutches is engaged. In some embodiments, the first mode selector clutch and the reverse clutch comprise a double-clutch connected to or otherwise configured to drive the common clutch shaft. When the first mode selector clutch is engaged, power at an output shaft of the second CVP is transferred to both the clutch shaft and the second input of the variator. When the first mode selector clutch is disengaged, power at the output shaft of the second CVP is transferred only to the second input of the variator.

A forward clutch is disposed on the engine output shaft. When the first mode selector clutch is disengaged, one of the forward clutch and the reverse clutch may be selectively engaged to directly transmit mechanical power generated by the engine to the first input of the variator. In particular, when the forward clutch is engaged and the reverse clutch is disengaged, the output shaft of the engine mechanically drives the first input of the variator. When the forward clutch is disengaged and the reverse clutch is engaged, the output shaft of the engine mechanically drives the clutch shaft and the clutch shaft drives the first input of the variator. Further, one or more gears are disposed in the mechanical path between the output shaft of the engine and the first input of the variator so that a direction of rotation of the first input of the variator when the forward clutch is engaged is opposite the direction of rotation of the first input of the variator when the reverse clutch is engaged.

The variator includes a low planetary gear set and a high planetary gear set. Power produced at the outputs of the low planetary gear set and the high planetary gear set reflect a sum of the power supplied to the first input and the second input of the variator. In particular, the gear ratios of the low planetary gear set are selected such that the output of the low planetary gear set rotates with high torque and at a low speed and the gear ratios of the high planetary gear set are selected such that the output of the high planetary gear set rotates with less torque and at a higher speed. In some embodiments, power supplied to the first input of the variator (i.e., power either from the second CVP or directly from the engine) drives a carrier of the high planetary gear set and planet gears of the high planetary gear set drive a ring gear of the low planetary gear set. Further, power supplied to the second input of the variator (i.e., power from the second CVP) drives the sun gears of both the low planetary gear set and the high planetary gear set.

A second mode selector clutch and a third mode selector clutch are connected to the range shaft and may be selectively engaged to transfer power from the low planetary gear set or the high planetary gear set of the variator, respectively, to the range shaft, which in turn drives the output shaft of the transmission. In some embodiments, engaging the second mode selector clutch transfers power from the carrier of the low planetary gear set to the range shaft and engaging the third mode selector clutch transfers power from the ring gear of the high planetary gear set to the range shaft. In some embodiments, the second mode selector clutch and the third mode selector clutch may comprise a double-clutch connected to or otherwise configured to drive the common range shaft.

When the reverse clutch is engaged (and the first mode selector clutch and the forward clutch are disengaged), mechanical power at the output shaft of the engine is directly transferred to a clutch shaft and drives the clutch shaft. A clutch shaft output gear is mechanically coupled to and drives the second input of the variator in a manner similar to when the forward mode selector clutch is engaged except in an opposite direction.

The transmission output shaft is driven by the second CVP only when the first mode selector clutch and the second mode selector clutch are engaged (and the third mode selector clutch is disengaged). Further, neither the forward clutch nor the reverse clutch is in the engaged state when the output shaft of the powertrain is driven by the second CVP only because the direction of the second CVP can be altered electronically. Thus, the transmission may be operated to drive the work vehicle in a forward and reverse direction and at a greater range of speeds before a shift is necessary.

In addition, having a plurality of clutches connected to each of the clutch shaft and the range shaft and having the forward clutch connected to the engine output shaft simplifies the geartrain architecture of the transmission. Such simplified gear train results in a reduction in a quantity of parts of the transmission and housing/packaging requirements thereof, which may yield cost and operational improvements.

A controller monitors the power demand and operating condition of the work vehicle and in response operates the components of the powertrain including the engine, one or more of the CVPs, the forward and rear clutches, and the first, second, and third mode selector clutches to generate sufficient power to meet such demand.

Example Multi-Mode Powertrain

Referring to FIG. 1, a work vehicle 100 may include a controller 102, a powertrain 106, and one or more sensors 110 disposed in a chassis 112. The controller 102 operates the powertrain 106 in response to signals and/or data from a plurality of sensors 110 to ensure consistent and smooth operation of the work vehicle 100. FIG. 1 generally depicts the work vehicle 100 as a wheel loader but the work vehicle 100 may be another configuration utilized in the agricultural, construction, forestry, mining, and other industries. It will further be understood that the disclosed powertrain 106 of the work vehicle 100 described herein may also be used in non-work vehicles and even non-vehicle applications (e.g., fixed-location power installations).

Figure 2:
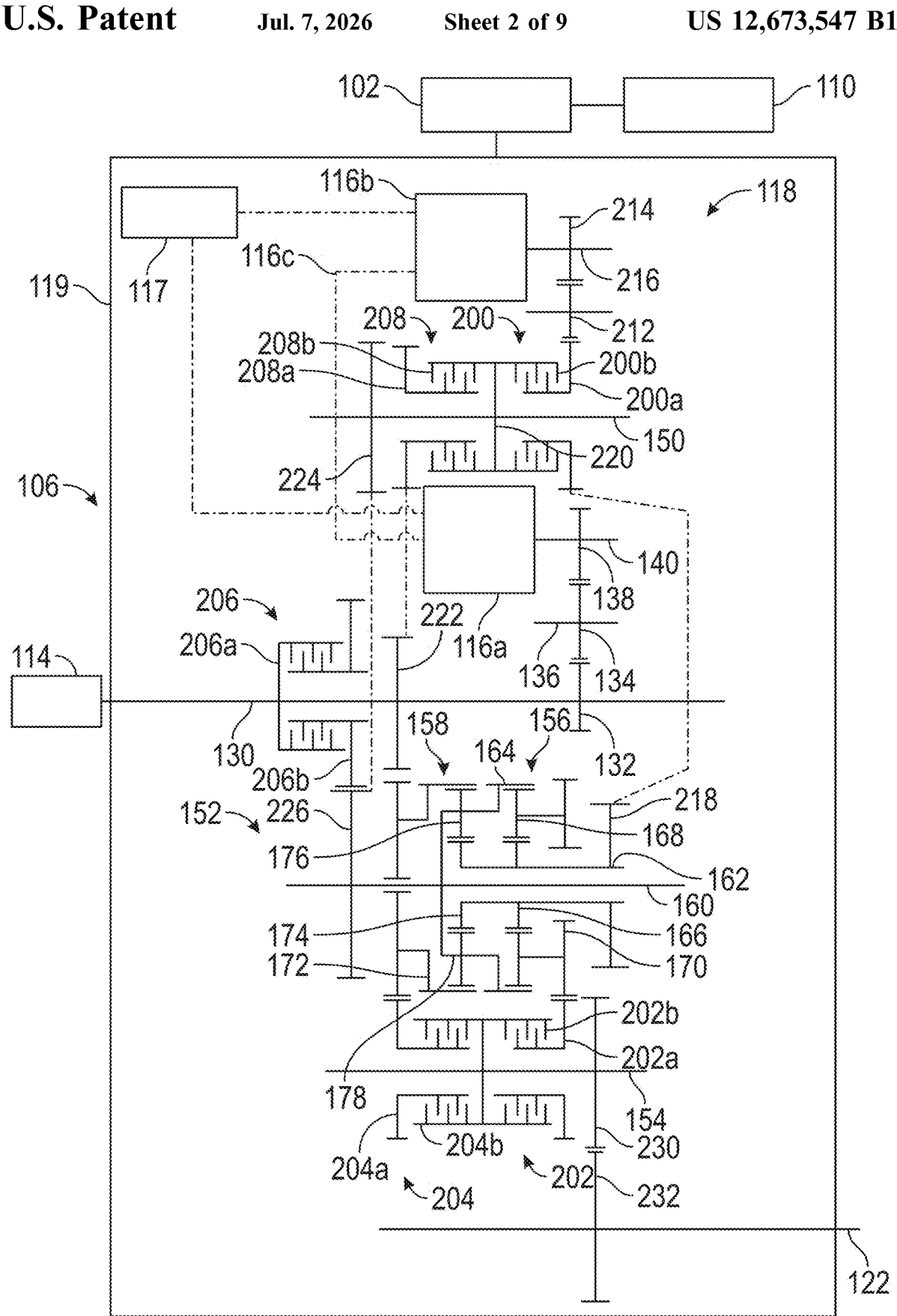
FIG. 2 is a schematic diagram of an example architecture for a multiple power source powertrain for the example work vehicle of FIG. 1.

Referring also to FIG. 2, the powertrain 106 includes one or more sources of power, such as an engine 114 (e.g., an internal combustion engine) and one or more continuously variable power sources, e.g., first and second continuously variable power sources (CVPs) 116a, 116b (e.g., one or more electrical motors) of a transmission 118, as well as various batteries and power transfer elements. Components of the transmission 118 are disposed in a transmission housing 119 and operated to transfer power from the power sources 114, 116a, 116b to one or more one or more ground-engaging members 120 via an output shaft 122. The ground-engaging members 120 may be, for example, wheels or tracks for travel and work operations of the work vehicle 100. The transmission 118 may also supply power to drive other vehicle systems, components, or implements (not shown). The transmission 118 may include various gears, shafts, clutches, and other power transfer elements that may be operated in a variety of ranges representing selected output speeds and/or torques. As described herein, the controller 102 monitors signals and/or data supplied by the one or more sensors 110 that indicate an operating state and demands of the work vehicle 100 and in response operates the transmission 118 in different modes in accordance with such operating state and demands.

The controller 102 may be configured as one or more computing device(s) with associated processor devices and memory architectures. As such, the controller 102 may be configured to execute instructions stored in the memory to undertake various computational and control functionality with respect to the vehicle 100 as described herein. The controller 102 may comprise, e.g., a computer, a device using one or more application specific integrated circuits (ASIC's) and/or field-programmable gate arrays (FPGA's), and/or combinations thereof. The computing device may be unitary or may be distributed multiple computing devices, and one or more such computing devices may be installed locally on or remote from the work vehicle 100. Each computing device may communicate with another computing device over one or more network(s) such as a local area network (LAN), a control area network (CAN), a cellular network, a wide area network (WAN) such as the Internet, and the like. In addition, the controller may be in electronic or hydraulic communication with various actuators, sensors, and other devices within (or outside of) the work vehicle 100.

In some embodiments, the controller 102 may be configured to receive input commands and to interface with an operator via a human-machine interface or operator interface (not shown) including typical steering, acceleration, velocity, transmission, and wheel braking controls, as well as other suitable controls. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices. The controller 102 may receive inputs from one or more sensors 110 (generally represented by sensor 110) associated with the various system and components of the work vehicle and based on these inputs generate suitable commands for components of the powertrain 106

The sensors 110 may include kinematic sensors that collect information associated with the position and/or movement of the work vehicle 100, such as one or more directional sensors and/or one or more ground speed sensors. Additional sensors (or otherwise, sources or data) may provide or include sources of powertrain data, including data sufficient to determine the current or anticipated mode of the transmission 118, information associated with the positions of one or more transmission clutches, torque and/or speed information associated with the engine 114, the first and second CVPs 116a, 116b, and/or elements of the transmission 118. For example, the sensors 110 may collect information associated with the current engine speed, e.g., directly or derived from other parameters.

As noted above, the powertrain 106 may include one or more power sources such as an engine 114, which may be an internal combustion engine of various known configurations and the transmission 118. Further, the transmission 118 may include one or more CVPs 116a, 116b and an inverter 117. The inverter 117 converts alternating current to direct current supplied from the controller 102 for use by the CVPs 116 or from one of the CVPs 116a for use by the other CVP 116b. The first CVP 116a and the second CVP 116b may be coupled to one another by a conduit 116c. In some embodiments, the conduit 116c may couple the first CVP 116a to the inverter 117 and the inverter to the second CVP 116b.

The transmission 118 transfers power from the one or more power sources 114, 116a, 116b to an output shaft 122, which is configured to supply power to the drivetrain (not shown) and thereby drive the ground engaging members 120. As described below, the transmission 118 includes a number of gearing, clutch, and control assemblies to suitably drive the output shaft 122 of the transmission 118 (and thus the powertrain 106) at different speeds, torque, and directions as necessary to meet the operating needs of the work vehicle 100.

In one embodiment, power generated by the engine 114 may drive an engine output shaft 130 and a gear 132 fixed to the engine output shaft 130. The gear 132 is enmeshed with a gear 134 that is fixed to a power take off shaft 136 and enmeshed with a gear 138 that is fixed to an input shaft 140 of the first CVP 116a. Thus, when the engine 114 drives the engine output shaft 130, the gear 132 transfers the power from the engine 114 to the gear 134 to drive both the power take off shaft 136 and the gear 138. The gear 138 transfers power to the input shaft 140 of the first CVP 116a. The first CVP 116a converts the power supplied to the input shaft 140 into electrical power and transmits such electrical power to the second CVP 116b via the conduit 116c. In some embodiments, the power take off shaft 136 supplies power to one or more implements and/or accessories (not shown) of the work vehicle 100. Further, the power take off shaft 136 may drive one or more idler gears (not shown) disposed between the gear 132 and the gear 138 as would be apparent to one who has ordinary skill in the art.

As described in greater detail below, the controller 102 operates the transmission 118 to transfer mechanical power generated by the engine 114 and/or the second CVP 116b to the output shaft 122 of the transmission 118 as needed to support operation of the work vehicle 100. The transmission includes a clutch shaft 150, a variator 152, and a range shaft 154. The variator 152 includes a low planetary gear set 156, a high planetary gear set 158, a first variator shaft 160, and a second variator shaft 162 concentrically supported on the first variator shaft 160 by, for example, one or more bearings and the like.

The low planetary gear set 156 includes a ring gear 164, a sun gear 166 fixed to and driven by the second variator shaft 162, one or more planet gears 168 enmeshed with both the ring gear 164 and the sun gear 166, and a carrier 170 coupled to the one or more planet gears 168. The high planetary gear set 158 includes a ring gear 172, a sun gear 174 fixed to and driven by the second variator shaft 162, one or more planet gears 176 enmeshed with both the ring gear 172 and a carrier 178. The carrier 178 is connected to and driven by the first variator input shaft 160. Further, the one or more planet gears 176 of the high planetary gear set 158 drive the ring gear 164 of the low planetary gear set 156. The low planetary gear set 156 and the high planetary gear set 158 of the variator 152 are configured to drive the carrier 170 of the low planetary gear set 156 at a low speed and high torque and to drive the ring gear of the high planetary gear set 158 at high speed and low torque when a particular amount of combined power is supplied to the first variator shaft 160 and the second variator shaft 162. Such combined power may be supplied by the second CVP 116b alone or may be a combination of power supplied directly by the engine 114 and the second CVP 116b.

The controller 102 operates components of the transmission 118 to deliver power from the second CVP 116b alone or both the second CVP 116b and the engine 114 to the output shaft 122 of the transmission 118 in accordance with a plurality of selectable modes. In a first mode suitable for operation when sufficient torque must be supplied to the output shaft 122 to, for example, begin transport of the work vehicle from a stationary state, transport the vehicle to carry loads at low speed, rapidly change between forward and reverse directions of travel, and the like. In the first mode, power generated by the second CVP 116b alone is transferred to both the first variator shaft 160 and the second variator shaft 162 and thereby to the output shaft 122. In this mode, mechanical power from the engine 114 is prevented from being transferred directly to the output shaft 122. In a second mode used when the work vehicle 100 is moving, for example, while pulling a load at a moderate speed or over terrain that requires a balance of torque and speed, the engine 114 supplies mechanical power directly to the first variator shaft 160 and the second CVP 116b supplies power to the second variator shaft 162. A sum of the power supplied by the engine 114 and the second CVP 116b is transferred from an output of the low planetary gear set 156 of the variator 152 to drive the output shaft 122. In a third mode, used when the work vehicle 100 is in motion and requires more speed than torque, power is supplied to the first variator shaft 160 and the second variator shaft 162 as in the second mode, however, a sum of the power generated by the engine 114 and the second CVP 116b is transferred from an output of the high planetary gear set 158 to drive the output shaft 122. Further, for each of the first, second, and third modes in which the controller 102 operates the powertrain 106, the controller 102 may further select if the output shaft 122 is rotated in a direction associated with forward movement of the work vehicle 100 or in an opposite direction associated with reverse movement of the work vehicle 100.

In some embodiments, the powertrain 106 includes a first mode selector clutch 200, a second mode selector clutch 202, a third mode selector clutch 204, a forward clutch 206, and a reverse clutch 208. Each clutch 200, 202, 204, 206, and 208 may be a wet clutch, dry clutch, dog collar clutch, a brake, a synchronizer, and the like. Each clutch 200, 202, 204, 206, and 208 includes an input component 200a, 202a, 204a, 206a, and 208a and an output component 200b, 202b, 204b, 206b, and 208b, respectively. The controller 102 may operate each clutch 200, 202, 204, 206, and 208 to be in an engaged state in which power supplied at the input component of the clutch is transferred to the output component thereof or in a disengaged state in which transfer of power at the input component of the clutch is prevented from being transferred to the output component thereof.

In one embodiment, an input component 200a of the first mode selector clutch 200 is enmeshed with an idler gear 212 that in turn is enmeshed with a drive gear 214 fixed to an output shaft 216 of the second CVP 116b. Further, the input component 200a is also enmeshed with a gear 218 fixed to the second variator shaft 162. In addition, an output component 200b of the first mode selector clutch 200 is connected to (i.e., fixed to, enmeshed with a gear that is fixed to, or is otherwise configured to drive) the clutch shaft 150. Thus, power generated by the second CVP 116b is transferred from the output shaft 216 thereof only to the second variator shaft 162 when the first mode selector clutch 200 is in the disengaged state via the drive gear 214, the idler gear 212 and the input component 200a of the first mode selector clutch 200, and the gear 218. When the first mode selector clutch 200 is in the engaged state, power from the second CVP 116b is transferred from the output shaft 216 thereof to the second variator shaft 162 in this manner and simultaneously to the clutch shaft 150 via the drive gear 214, the idler gear 212, the input component 200a, and the output component 200b of the first mode selector clutch 200.

The input component 208a of the reverse clutch 208 is enmeshed with a gear 222 fixed to the engine output shaft 130 and the output component 208b of the reverse clutch 208 is connected to the clutch shaft 150. When the reverse clutch 208 is in the engaged state, mechanical power generated by the engine 114 is transferred from the engine output shaft 130 to the clutch shaft 150 via the gear 222, the input component 208a, and the output component 208b. The input component 208a of the reverse clutch and the gear 222 are configured to rotate in opposite directions, e.g., by being enmeshed with one another without any idler gear or an even number of idler gears therebetween. Thus, when the reverse clutch 208 is engaged, the engine output shaft 130 and the clutch shaft 150 rotate in opposite directions.

A clutch shaft output gear 224 is fixed to the clutch shaft 150 and is enmeshed with a gear 226 fixed to the first variator shaft 160 so that power from the clutch shaft 150 drives the first variator shaft 160 when the first mode selector clutch 200 or the reverse clutch 208 is in the engaged state. Further, because the output components 200b, 208b of both the first mode selector clutch 200 and the reverse mode clutch 208, respectively, drive the clutch shaft 150, the controller 102 causes neither or only one of the first mode selector clutch 200 or the reverse mode clutch 208 to be in the engaged state at any particular time.

An input component 206a of the forward clutch 206 is connected to the engine output shaft 130 and an output component 206b of the forward clutch 206 is connected to the first variator shaft 160. Thus, power generated by the engine 114 is transferred directly to the first variator shaft 160 via the engine output shaft 130, the input component 206a, and the output component 206b. Further, because the clutch shaft output gear 224 (driven when the first mode selector clutch 200 or the reverse clutch 208 is in the engaged state) and the output component 206b of the forward clutch 206 both drive the gear 226, the controller 102 engages none or only one of the first mode selector clutch 200, the forward mode clutch 206, or the reverse clutch 208 at any particular time.

As discussed above, power generated by the second CVP 116b may be supplied to both the first variator shaft 160 and the second variator 162 simultaneously when the first mode selector clutch 200 is in the engaged state and the forward and reverse clutches 206, 208 are in the disengaged state.

Alternately, power generated by the engine 114 may be supplied directly (i.e., without first being converted to electrical power by the first CVP 116*a*) to the first variator shaft 160 and power generated by the second CVP 116*b* may be supplied to the second variator shaft 162 when the first mode selector clutch 200 is in the disengaged state and one of the forward or reverse clutches 206, 208 is in the engaged state.

Power generated by the engine 114 and/or the second CVP 116*b* is transferred from the variator 152 to the output shaft 122 via the range shaft 154 in accordance with operation of the second mode selector clutch 202 and the third mode selector clutch 204. In particular, an input component 202*a* of the second mode selector clutch 202 is enmeshed with the carrier 170 of the low planetary gear set 156 of the variator 152. An output component 202*b* of the second mode selector clutch 202 is connected to the range shaft 154. An input component 204*a* of the third mode selector clutch 204 is enmeshed with the ring gear 172 of the high planetary gear set 158 and an output component 204*b* of the second mode selector clutch 204 is connected to the range shaft 154. A range shaft output gear 230 is also connected to and is driven by the range shaft 154. The range shaft output gear 230 is enmeshed with or is configured to drive a gear 232 fixed to the output shaft 122 of the powertrain 106. Thus, power is selectively transferred from the low planetary gear set 156 or the high planetary gear set 158 to the range shaft 154 when the second mode selector clutch 202 or the third mode selector clutch 204, respectively, is in the engaged state. Further, because the output component 202*b* of the second mode selector clutch 202 and the output component 204*b* of the third mode selector clutch 204 are both configured to drive the range shaft 154, the controller 102 causes only one of the second mode selector clutch 202 or the third mode selector clutch 204 to be in the engaged state at any particular time.

Thus, when the powertrain 106 is operated to transport the work vehicle 100 in a forward direction, the controller 102 operates the clutches 200, 202, 204, 206, and 208 to select the operating mode of the transmission 118 as shown in Table 1 below.

TABLE 1

| Mode | First Clutch 200 | Second Clutch 202 | Third clutch 204 | Forward 206 | Reverse 208 |
|---|---|---|---|---|---|
| First | Engaged | Engaged | Dis-engaged | Dis-engaged | Dis-engaged |
| Second | Dis-engaged | Engaged | Dis-engaged | Engaged | Dis-engaged |
| Third | Dis-engaged | Dis-engaged | Engaged | Engaged | Dis-engaged |

Figure 2A:
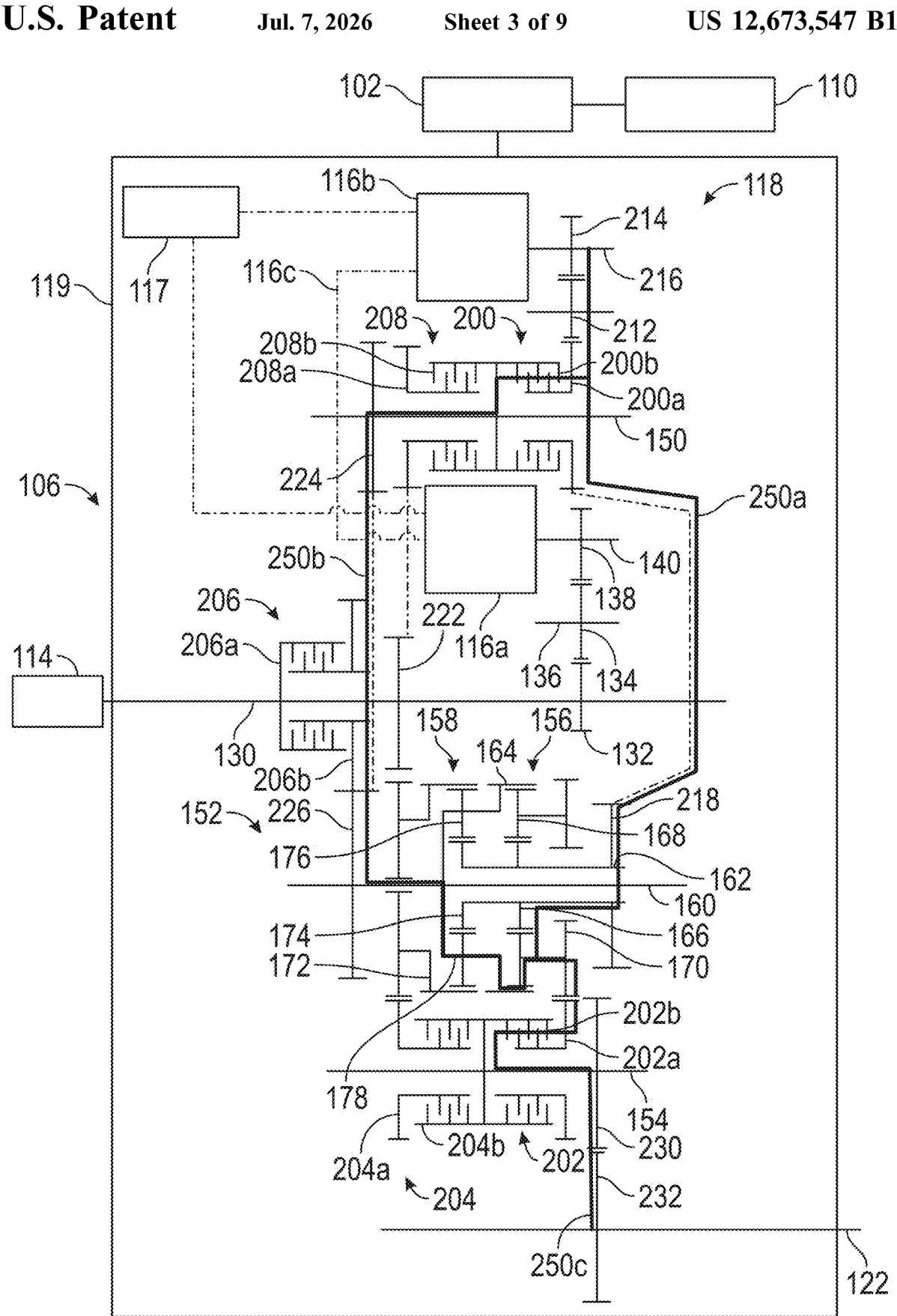
FIG. 2A is a schematic diagram showing a power transfer path in a first forward or reverse operating mode of the example architecture of FIG. 2.

FIG. 2A illustrates the power transfer path when the controller 102 operates the transmission 118 in the first mode to drive the work vehicle 100 in a forward direction. Referring also to FIG. 2A, a line 250*a* shows the power transfer path between the output shaft 216 of the second CVP 116*b* and the first variator input shaft 160, a line 250*b* shown the power transfer path between the output shaft of 216 and the second variator input shaft 162, and line 250*c* shows a power transfer path between the carrier 170 of the low gear set 156 of the variator 152 and the output shaft 122 of the transmission 118.

Figure 2B:
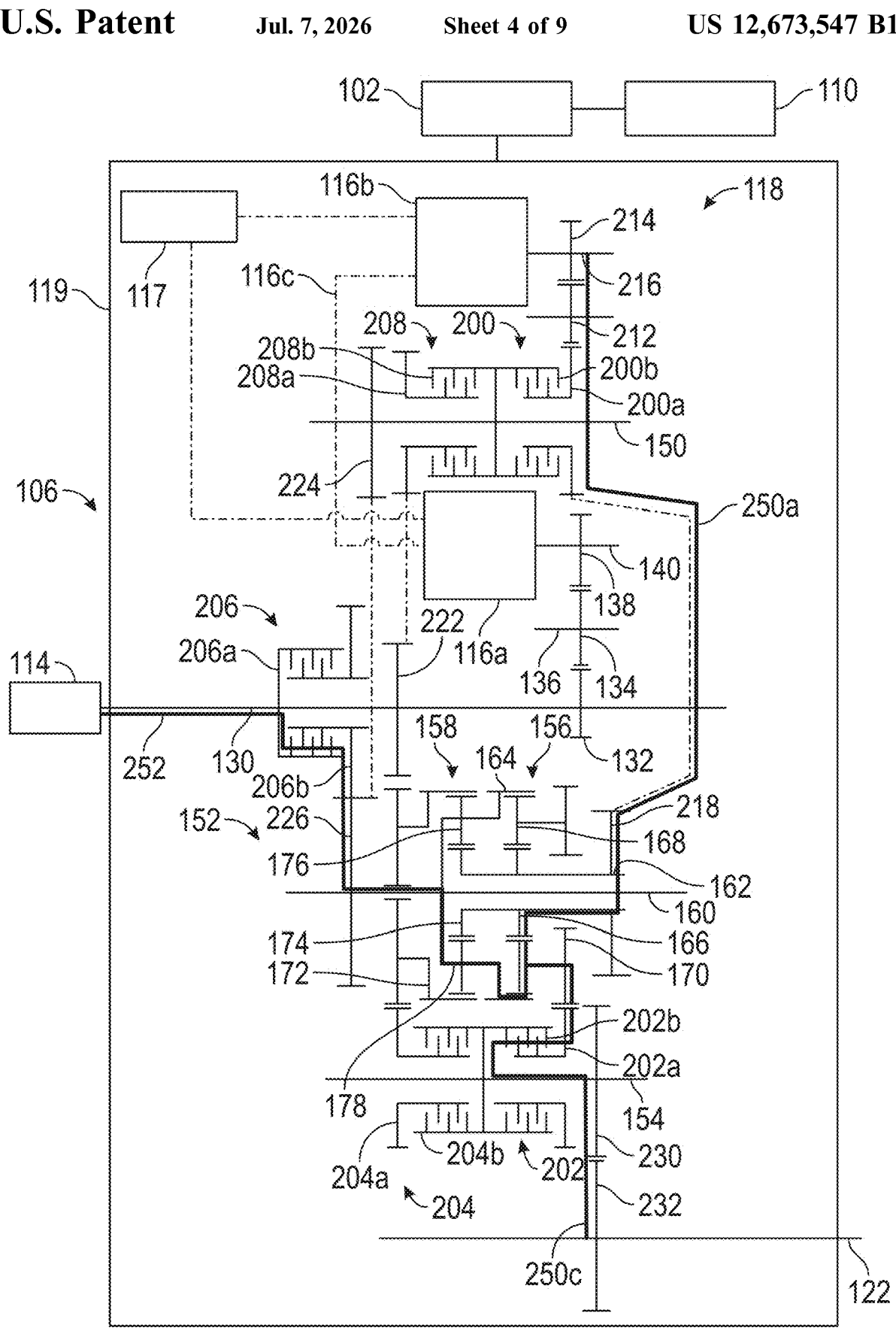
FIG. 2B is a schematic diagram showing a power transfer path in a second forward operating mode of the example architecture of FIG. 2.

FIG. 2B illustrates the power transfer path when controller 102 operates the transmission 118 in the second mode to drive the work vehicle 100 in the forward direction. Referring to FIG. 2B, a line 252 shows the power transfer from the output of the engine 114 to the first variator shaft 160. The lines 250*a* and 250*c* show the power transfer between second CVP 116*b* and the second variator shaft 162 and from the low planetary gear set 156 to the output shaft 122.

Figure 2C:
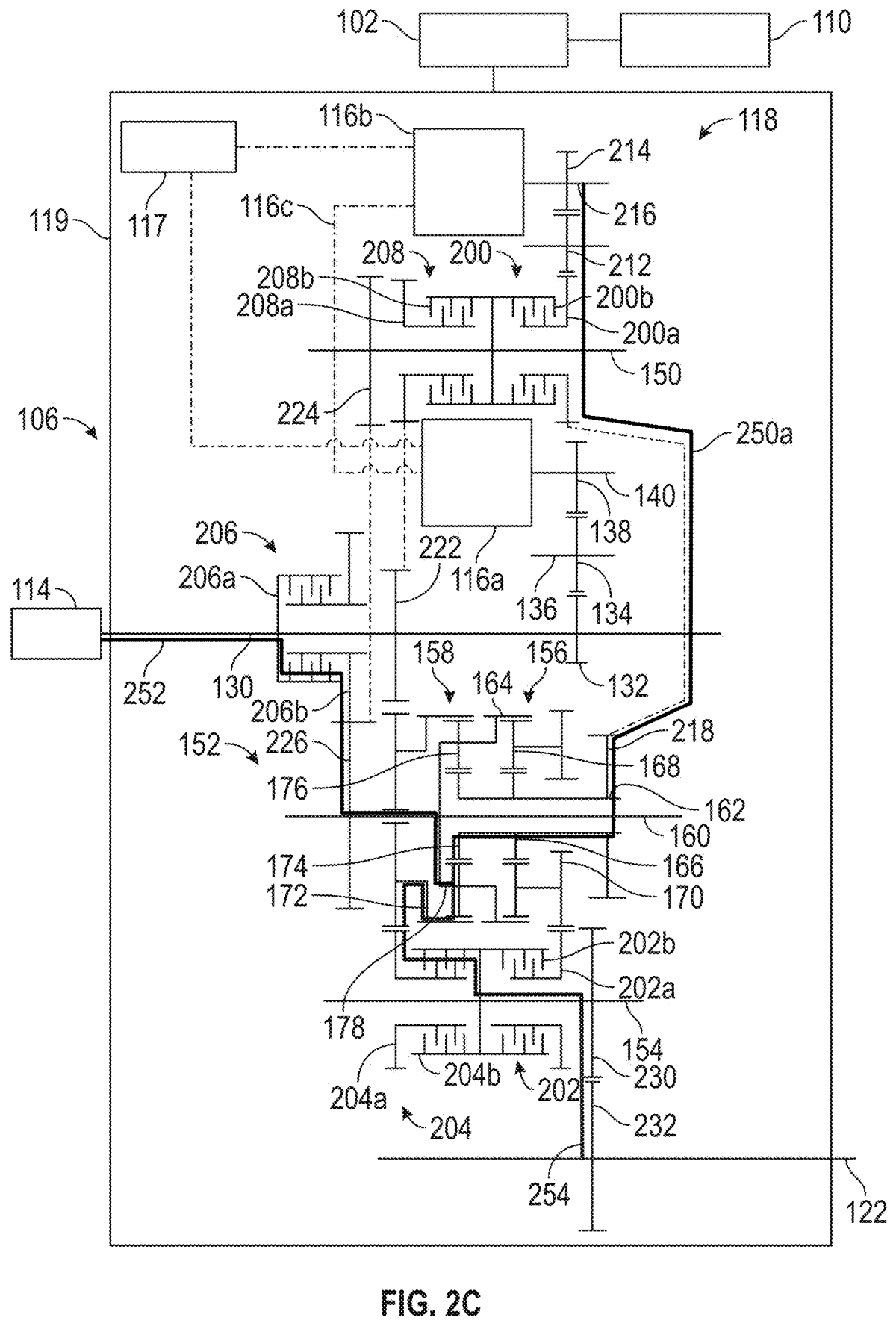

FIG. 2C illustrates the power transfer path when the controller 102 operates the transmission 118 in the third mode to drive the work vehicle 100 in the forward direction. Referring to FIG. 2C, the lines 250*a* and the line 252 show the power transfer from the second CVP 116*b* to the second variator shaft and from the engine 114 to the first variator shaft, respectively. The line 254 shows the power transfer from ring gear 172 of the high planetary gear set 158 of the variator 152 to the output shaft 122.

Table 2 shows how the controller 102 operates the clutches 200, 202, 204, 206, and 208 to select the operating mode of the transmission 118 when the powertrain 106 is operated to transport the work vehicle 100 in a reverse directions.

TABLE 2

| Mode | First Clutch 200 | Second Clutch 202 | Third clutch 204 | Forward 206 | Reverse 208 |
|---|---|---|---|---|---|
| First | Engaged | Engaged | Dis-engaged | Dis-engaged | Dis-engaged |
| Second | Dis-engaged | Engaged | Dis-engaged | Dis-engaged | Engaged |
| Third | Dis-engaged | Dis-engaged | Engaged | Dis-engaged | Engaged |

Note that the forward and reverse clutches 206, 208 are both in the disengaged states when the transmission 118 is operated in the first mode in which power generated by the second CVP 116*b* alone drives the output shaft 122 of the transmission 118. This is because the controller 102 electronically controls the direction of the output shaft 216 of the second CVP 116*b* in accordance with the transport direction and power needs of the work vehicle 100. Thus, the power transfer from the second CVP 116*b* to the output shaft when the transmission 118 is operated 12 in the first mode to transport the work vehicle in the reverse direction is identical to that shown in FIG. 2A.

Figure 2D:
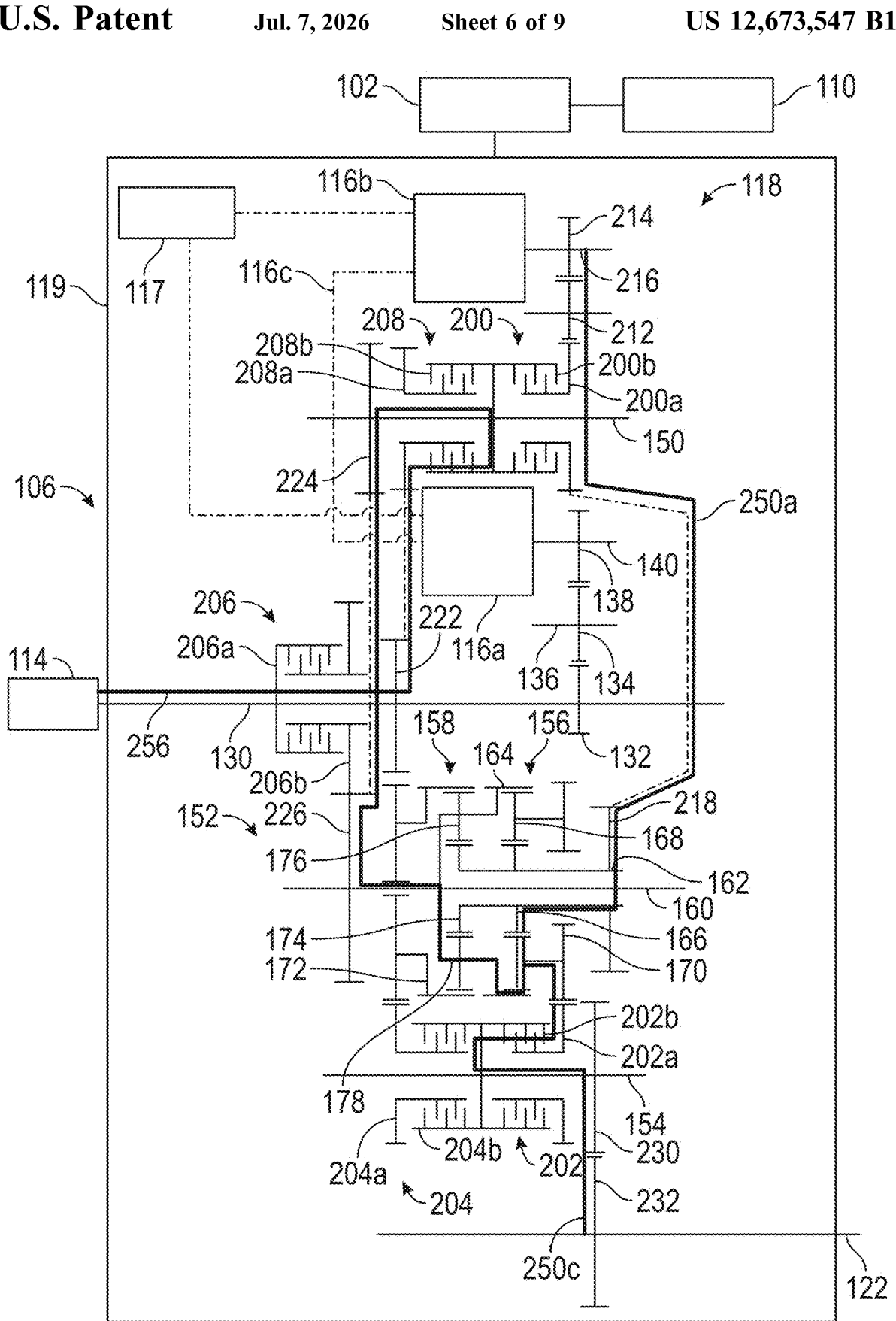
FIG. 2D is a schematic diagram showing a power transfer path in a second reverse operating mode of the example architecture of FIG. 2.

FIG. 2D shows the power transfer path between the engine 114 and the second CVP 116*b* to the output shaft 122 when the controller 102 operates the transmission 118 in the second modes to drive the work vehicle 100 in the reverse direction. Referring to FIG. 2D, a line 256 shows the power transfer path from the engine 114, the reverse clutch 208, the clutch shaft 150, and the first variator shaft 160. The power transfer paths from the second CVP 116*b* to the second variator shaft 162 and from the low planetary gear set 156 to the output shaft 122 are shown by the lines 250*a* and 250*c*.

Figure 2E:
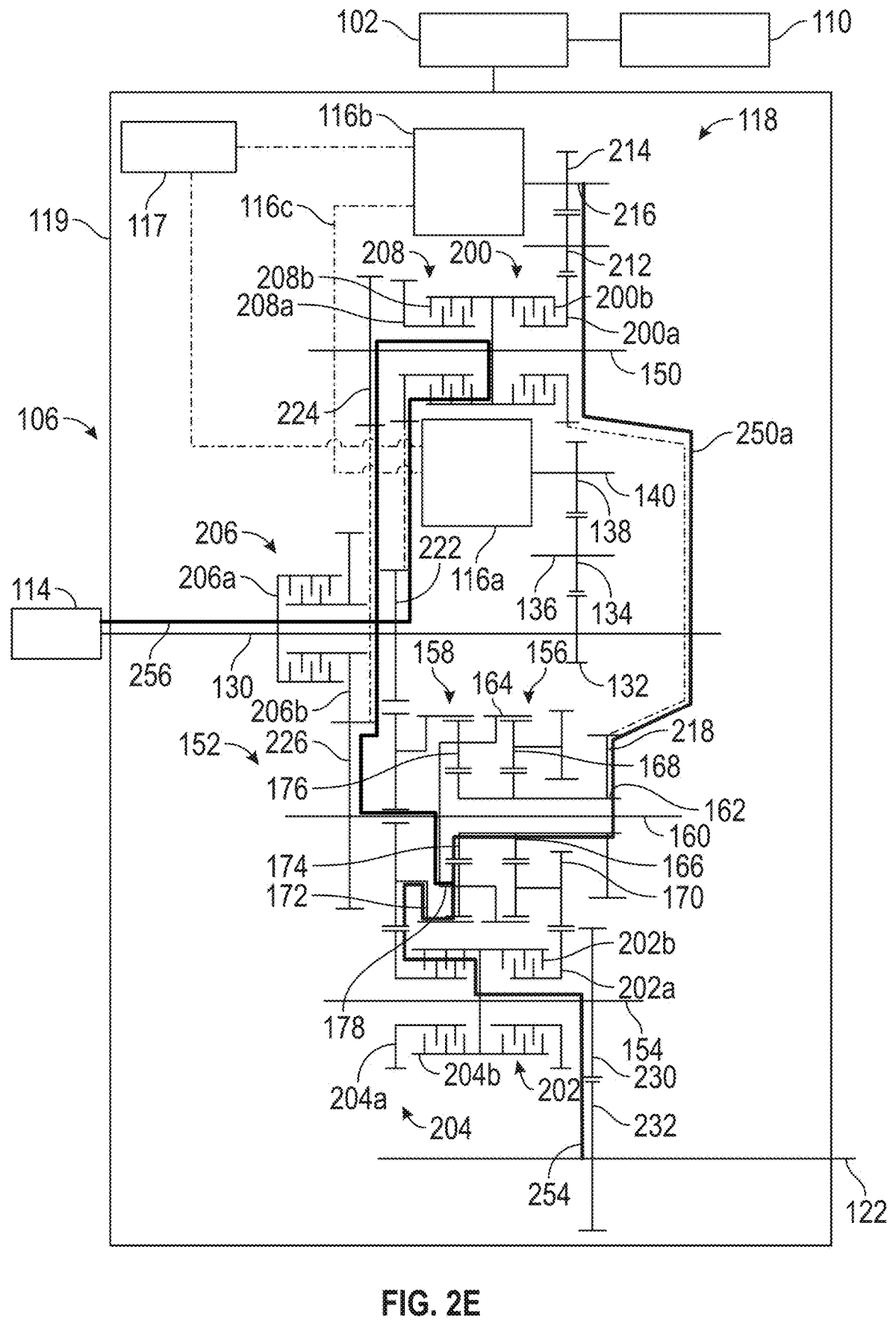

FIG. 2E shows the power transfer path between the engine 114 and the second CVP 116*b* to the output shaft 122 when the controller 102 operates the transmission 118 in the third modes to drive the work vehicle 100 in the reverse direction. Referring to FIG. 2E, the line 256 shows the power transfer path from the engine 114 to the first variator shaft 160, the line 250 shows the power transfer path from the second CVP 116*b* to the second variator shaft 162, and the line 254 shows the power transfer path from the high planetary gear set 158 to the output shaft 122.

Figure 3:
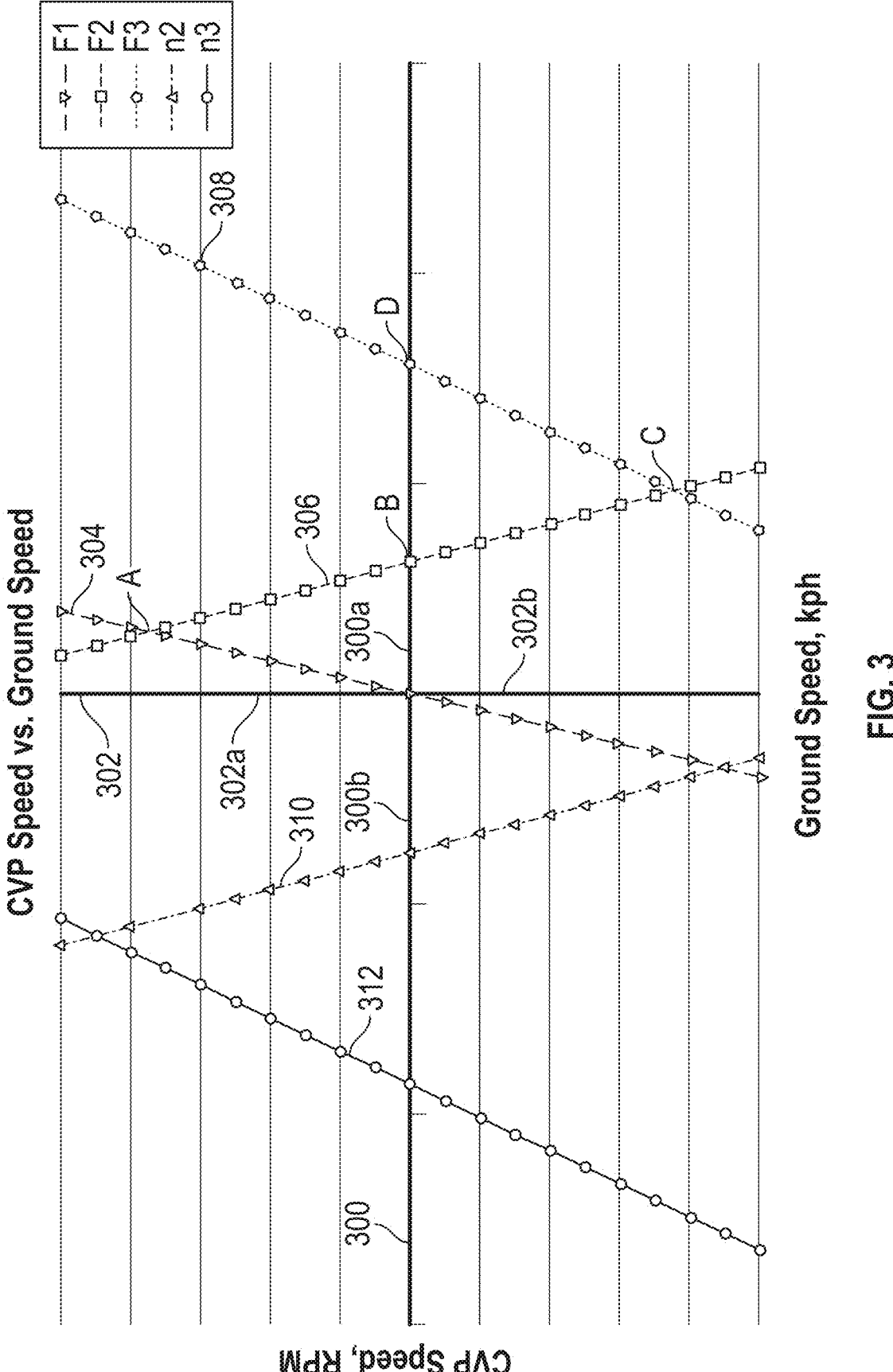
FIG. 3 is a plot showing a relationship between a ground speed of the work vehicle of FIG. 1 and an output of a continuously variable power source of the powertrain of FIG. 1.

In some embodiments, the controller 102 may electronically adjust the speed of the second CVP 116*b* while the powertrain 106 is being operated to supply the operating requirements of the work vehicle 100. FIG. 3 is a plot of how the speed of the second CVP 116*b* may be varied as the work vehicle 100 is transported in one embodiment of the powertrain 106. Referring to FIGS. 2 and 3, a horizontal axis 300 denotes a transport speed of the work vehicle 100. A positive portion 300*a* of the horizontal axis 300 represents forward movement of the work vehicle 100 and a negative portion 300*b* of the horizontal axis 300 represents reverse movement of the work vehicle 100. A vertical axis 302 denotes rotational speed of the output shaft 216 of the second CVP 116*b* wherein a positive portion 302*a* of the vertical axis 302 represents rotation of the output shaft 216 in a first direction and a negative portion 302*b* of the vertical axis 302 represents rotation of the output shaft 216 in a second direction opposite the first direction. Note that the engine 114 is operated at a constant speed in the plot shown in FIG. 3. In some embodiments, the first direction of the output shaft 216 of the second CVP 116*b* may be identical to the direction of rotation of the engine output shaft 130 when the work vehicle 100 is moved in a forward direction and the second direction of the output shaft 216 may be identical to the direction of rotation of the engine output shaft 130 when the work vehicle 100 is moved in a reverse direction.

A line 304 shows a relationship between the rotational speed of the output shaft 216 of the second CVP 116*b* and the ground speed of the work vehicle 100 when the controller 102 operates the powertrain 106 in the first mode. As discussed above, power from the second CVP 116*b* alone is used to transport the work vehicle 100 and the direction and speed of the work vehicle 100 is determined by the direction and speed of rotation of the output shaft 216 of the second CVP 116*b* without requiring a mode or a shift change, which results in smoother operation of the work vehicle 100 during low speeds and when the transport direction of the work vehicle 100 is changed often.

A line 306 shows a relationship between the rotational speed of the output shaft 216 and forward velocity of the work vehicle 100 when the forward clutches 206 is engaged and the powertrain 106 is operated in the second mode. A line 308 shows a relationship between the rotational speed of the output shaft 216 and the forward velocity of the work vehicle 100 when the forward clutch 206 is engaged and the powertrain 106 is operated in the third mode.

As shown by line 306, although the work vehicle 100 is transported in a forward direction, the controller 102 operates the second CVP 116*b* so that the output shaft 216 rotates in the first direction when the work vehicle 100 is moving forward at velocities between those associated with points A and point B and in the second direction (opposite the first direction) when the work vehicle 100 is still moving forward at velocities between those associated with points between B and C. The controller 102 reverses the rotational direction of the output shaft 216 of the second CVP 116*b* to compensate for forward power transferred from the engine 114 directly to the variator 152. Operating the second CVP 116*b* in this manner extends the range of velocities in which the work vehicle 100 may operate within the second mode (i.e., without requiring a shift change). Further, as shown by the line 308, after the controller 102 has transitioned operation of the powertrain 106 from the second mode to the third mode, the rotational speed of the output shaft 216 in the second direction is reduced as the forward velocity of the work vehicle 100 increases and eventually both the engine 114 and the output shaft 216 of the second CVP 116*b* are driven in the same (first) direction when the work vehicle 100 is moving forward at a velocity greater than that associated with the point D, again increasing the range of velocities the work vehicle 100 may operate without requiring a shift change. Lines 310 and 312 show the relationship between the rotational speed of the output shaft 216 and reverse velocity of the work vehicle 100 when the reverse clutch 208 is engaged and the controller 102 operates the powertrain 106 in the second mode (line 310) and the third mode (line 312).

Figure 4:
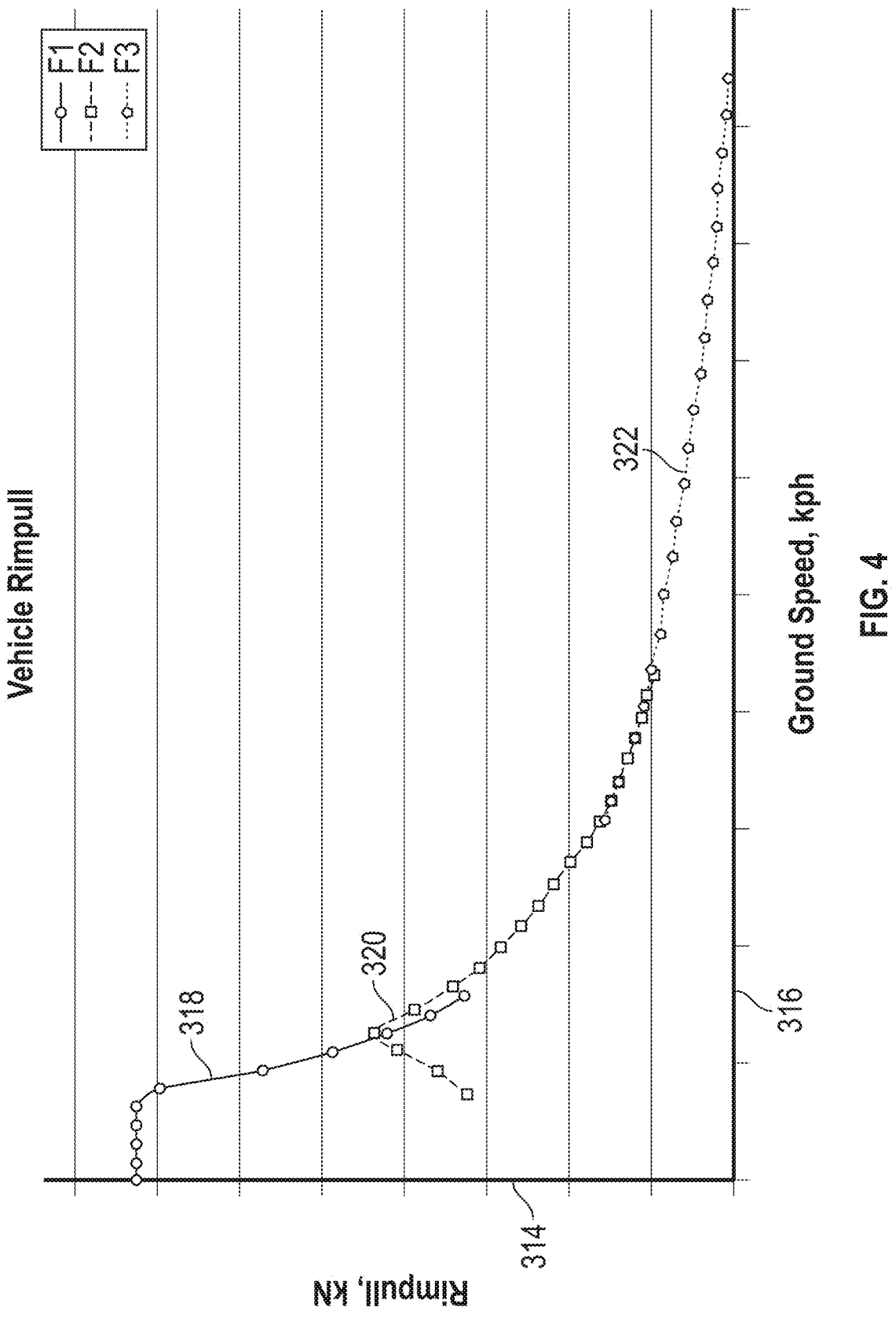
FIG. 4 is a plot showing a relationship between a ground speed and a rim pull of the work vehicle of FIG. 1.

FIG. 4 is a plot that shows how rim pull (i.e., amount of tractive force supplied to the ground engagement members 120) denoted on a vertical axis 314 of an embodiment of the work vehicle 100 varies with the forward velocity of the work vehicle 100 denoted on a horizontal axis 316. A curve 318 shows the relationship between the rim pull and forward velocity of the work vehicle 100 when the controller 102 operates the powertrain 106 in the first mode and power for the rim pull and forward velocity of the work vehicle 100 is generated by the second CVP 116*b* alone. Curves 320 and 322 show relationships between the rim pull and the forward velocity of the work vehicle 100 when the powertrain 106 is operated in the second mode and the third mode, respectively, when power directly from the engine 114 and from the second CVP 116*b* are summed in the variator 152 to transport the work vehicle 100. As would be apparent to one having ordinary skill in the art, the plot shown in FIG. 4 indicates the work vehicle generates adequate rim pull without running out of torque from the CVP 116*b* and that the gear ratios used between the engine 114 and/or the CVP 116*b* and the output shaft 122 of the transmission 118 in modes 1, 2, and 3 are appropriately defined.

One having skill in the art will appreciate that the arrangement of components of the powertrain 106 disclosed herein is simpler and utilizes fewer components than conventional powertrains by, for example, coupling the forward clutch 206 to the output shaft 130 of the engine 114, having the first mode selector clutch 200 and the reverse clutch 208 both configured to selectively drive the clutch shaft 150, having the second mode selector clutch 202 and the third mode selector clutch 204 both configured to selectively drive the range shaft 154, and the like. Such arrangement of components may result in a streamlined and compact packaging that may reduce the costs and space requirements of such powertrain 106. Further, as noted above, coupling the second CVP 116*b* with reduced gear ratios may reduce reflected inertia from the second CVP 116*b* and thereby improve shift quality and operator comfort during operation of the work vehicle 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A powertrain for a work vehicle, comprising:
an engine having an output shaft; and
a transmission, comprising:
a continuously variable power source (CVP) having an output shaft mounting an output gear;
a variator that is operably connected to the engine and the CVP, wherein the variator comprises a first planetary gear set and a second planetary gear set;
a range shaft having a range shaft output gear mounted thereto;
a clutch shaft;
a forward clutch having an input component mounted to the output shaft of the engine and having an output component configured to directly transfer power from the engine to the variator when the input component of the forward clutch is coupled with the output component of the forward clutch;
a reverse clutch having an input component driven by the output shaft of the engine and having an output component mounted to the clutch shaft;
a first mode selector clutch having a first input component enmeshed with an output gear of the first planetary gear set and a first output component mounted to the range shaft;
a second mode selector clutch having a second input component enmeshed with an output gear of the second planetary gear set and a second output component mounted to the range shaft;
a third mode selector clutch having a third input component enmeshed with both the output gear of the CVP and an input gear of the first planetary gear set and having a third output component mounted to the clutch shaft; and
an output shaft having an output shaft gear driven by the range shaft output gear;
wherein the first mode selector clutch and the second mode selector clutch are selectively operable to couple the first input component with the first output component or the second input component with the second output component and thereby transfer power from the variator to the output shaft.

2. The powertrain of claim 1, wherein the first planetary gear set is a low planetary gear set and the second planetary gear set is a high planetary gear set.

3. The powertrain of claim 2, wherein the output gear of the first planetary gear set is a carrier of the first planetary gear set.

4. The powertrain of claim 2, wherein the output gear of the second planetary gear set is a ring gear of the second planetary gear set.

5. The powertrain of claim 1, wherein the powertrain is operated in a first mode in which the third mode selector clutch is engaged to transfer power to both the clutch shaft and the variator using power from the CVP, a second mode in which the first mode selector clutch is engaged and the third mode selector clutch is disengaged, and a third mode in which the second mode selector clutch is engaged.

6. The powertrain of claim 1, further including a clutch shaft output gear mounted to the clutch shaft, wherein the clutch shaft output gear is operable to transfer power to the variator.

7. The powertrain of claim 1, wherein the CVP operates in a first direction and an opposite second direction while the output shaft is driven in the first direction.

8. A transmission for a work vehicle having an engine, the transmission comprising:
a housing having disposed therein:
a continuously variable power source (CVP) having an output shaft mounting an output gear;
a variator that is operably connected to the engine and the CVP, wherein the variator comprises a first planetary gear set and a second planetary gear set;
a range shaft having a range shaft output gear mounted thereto;
a clutch shaft;
a forward clutch having an input component mounted to an output shaft of the engine and having an output component configured to directly transfer power from the engine to the variator when the input component of the forward clutch is coupled with the output component of the forward clutch;
a reverse clutch having an input component driven by the output shaft of the engine and having an output component driving the clutch shaft;
a first mode selector clutch having a first input component enmeshed with an output gear of the first planetary gear set and a first output component configured to drive the range shaft;
a second mode selector clutch having a second input component enmeshed with an output gear of the second planetary gear set and a second output component configured to drive the range shaft; and
a third mode selector clutch having a third input component enmeshed with both the output gear of the CVP and an input gear of the first planetary gear set and having a third output component mounted to the clutch shaft; and
an output shaft driven by the range shaft output gear;
wherein the first mode selector clutch and the second mode selector clutch are selectively operable to couple the first input component with the first output component or the second input component with the second output component and thereby transfer power from the variator to the output shaft.

9. The transmission of claim 8, wherein the first planetary gear set is a low planetary gear set and the second planetary gear set is a high planetary gear set.

10. The transmission of claim 9, wherein the output gear of the first planetary gear set is a carrier of the first planetary gear set.

11. The transmission of claim 9, wherein the output gear of the second planetary gear set is a ring gear of the second planetary gear set.

12. The transmission of claim 8, wherein the work vehicle is operated in a first mode in which the third mode selector clutch is engaged to transfer power to both the clutch shaft and the variator using power generated by the CVP, a second mode in which the first mode selector clutch is engaged, and a third mode in which the second mode selector clutch is engaged.

13. The transmission of claim 8, further including a clutch shaft output gear mounted to the clutch shaft, wherein the clutch shaft output gear is operable to transfer power from the clutch shaft to the variator.

14. The transmission of claim 8, wherein the CVP operates in a first direction and an opposite second direction while the output shaft is driven in the first direction.

* * * * *